INVENTOR.
FRANK A. LITZ
JOHN J. LYNOTT
BY
Edward A. Robinson
ATTORNEY

Jan. 24, 1961

F. A. LITZ ET AL

CYLINDER ADDER 2,969,042

Filed July 26, 1957

3 Sheets-Sheet 2

Jan. 24, 1961

F. A. LITZ ET AL

CYLINDER ADDER 2,969,042

Filed July 26, 1957

3 Sheets-Sheet 3

United States Patent Office 2,969,042

Patented Jan. 24, 1961

2,969,042

CYLINDER ADDER

Frank A. Litz, Santa Clara County, and John J. Lynott, Los Gatos, Calif., assignors to International Business Machines Corporation, New York, N.Y., a corporation of New York Filed July 26, 1957, Ser. No. 674,416

15 Claims. (Cl. 121—38)

This invention relates to apparatus for controllably translating and positioning machine elements and the like, and more particularly relates to hydraulic and pneumatic apparatus which may be mechanically arranged to produce selected increments of movement.

In a device such as a line printer, it may be required that each of several type bars be moved to a selected position to present a selected character at a printing point during each printing stroke. The movement of translation of the type bars must be selected by apparatus which is responsive to input signals such as coded voltage pulses.

Other uses for a selective movement translating device may be found in the computer art. Electronic computing machines may be equipped with apparatus for storing information in a file which may be magnetic or optical in character. To introduce information into or to read information from such a store or file requires that a transducer head be translated to a desired location in accordance with address signals or commands. Thus, the transducer head must be moved to a selected position in response to address signals received from electronic components of a computing machine.

It is an object of this invention to provide a simple arrangement for translating a device such as a transducer head or file bin through a selected displacement or amount of movement; this arrangement may be composed of a plurality of single displaceable devices mechanically coupled to provide a total displacement equal to the sum of selected individual displacements.

A further object of this invention is to provide apparatus for translating a device in accordance with an electrical signal which may be binary in nature such that the total displacement is equal to the sum of the individual binary signals.

Another object is to provide a displaceable hydraulic device which may be tandemly coupled to other similar hydraulic devices and which may be selectively activated to provide a displacement or to fail to provide a displacement which will contribute to a positioning of a transducer mechanically coupled to all of the similar hydraulic devices.

According to this invention a plurality of hydraulic cylinders, each containing a piston displaceable through a predetermined amount, are coupled in tandem—the piston of one cylinder being mechanically connected to the next subsequent cylinder. Therefore, the next subsequent cylinder will be moved or translated by the displacement of the preceding piston. The total movement of a device coupled to the final piston will be equal to the sum of the movements of each displaced piston.

Other objects of the invention will be pointed out in the following description and claims and illustrated in the accompanying drawings which disclose, by way of example, the principle of the invention and the best mode which has been contemplated of applying that principle.

Figs. *5a* and *5b* are similar sectional views of the four-way valve for controlling the cylinders but with a valve spool shown in alternative operative positions whereby the fluid may be reversed.

Figure 6:
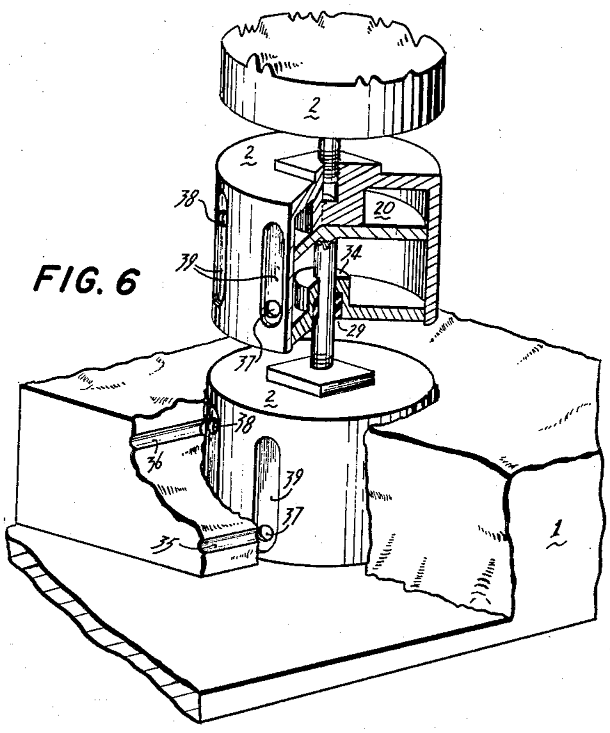

Fig. 6 is a fragmentary perspective view of another embodiment of this invention wherein the tandemly connected cylinders contain ports with elongated slots for hydraulic connections to the four-way valve.

Figure 7:
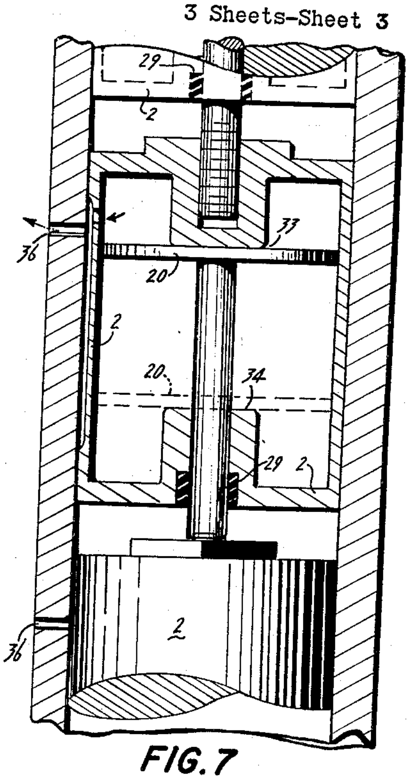

Fig. 7 is a vertical sectional view of the hydraulic cylinders illustrated in Fig. 6.

Figure 8:
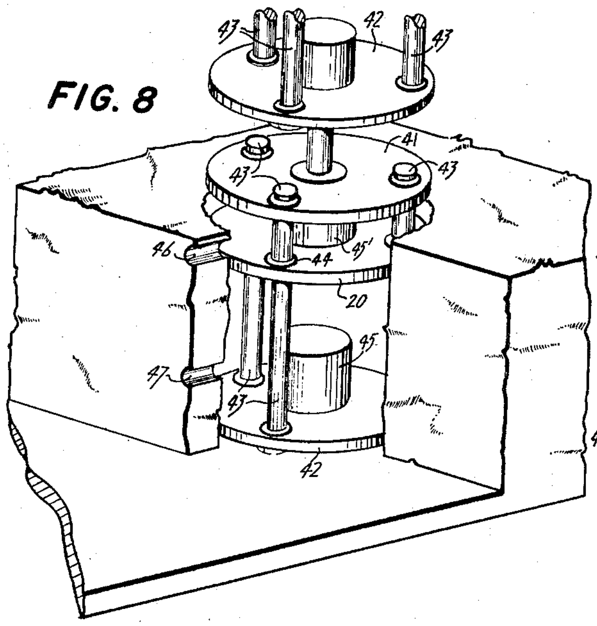

Fig. 8 is a fragmentary perspective view of yet another form of this invention wherein a single cylinder is fitted with a plurality of pairs of sectional dividing plates containing a piston therein and wherein each piston is mechanically coupled to move the next successive pair of dividing plates.

Figures 1, 2:
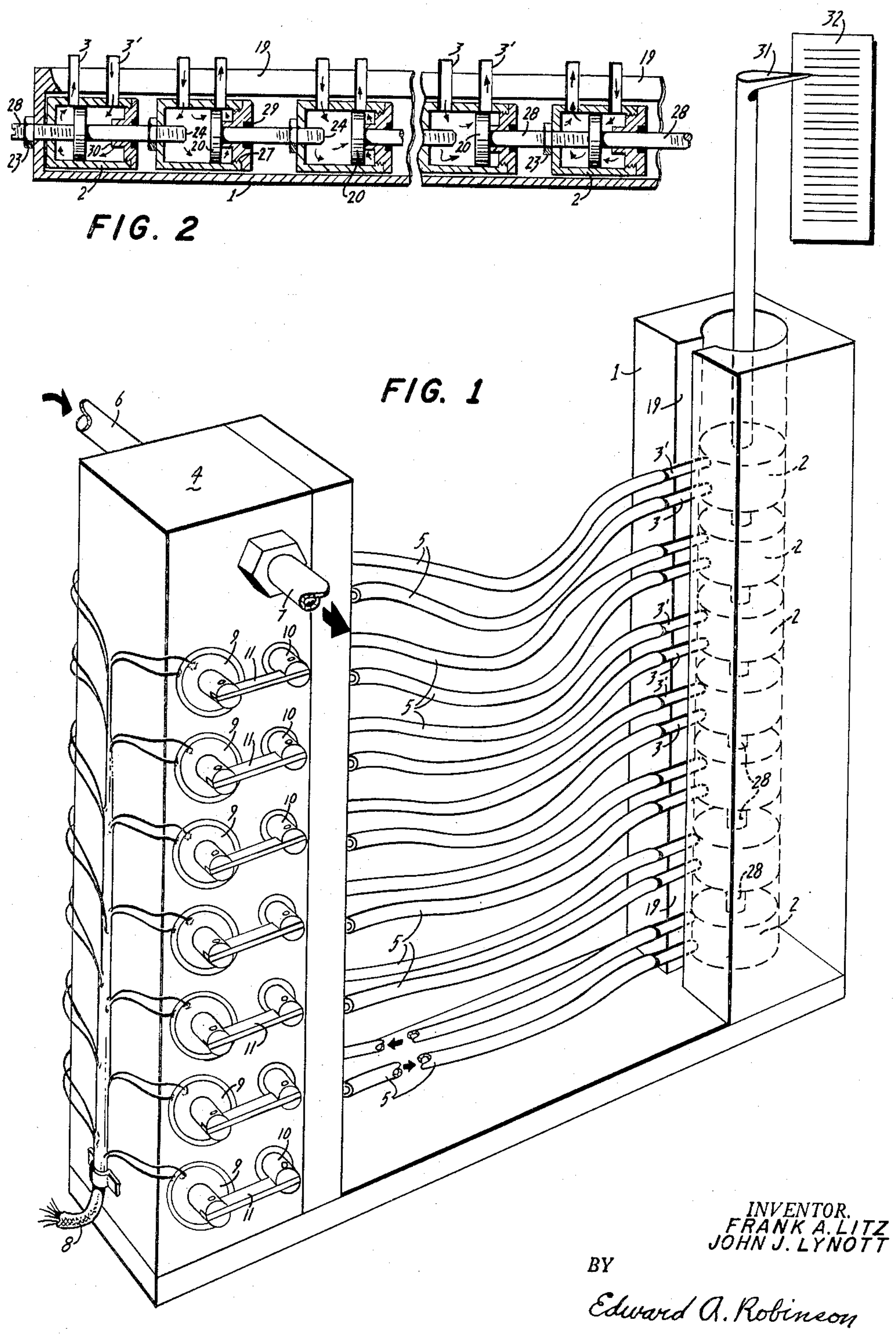
Fig. 1 is a perspective view of one form of this invention illustrating the tandemly connected cylinders and the solenoid valve block for controlling the cylinders.
Fig. 2 is a sectional view illustrating the assembled cylinders, tandemly arranged within a guide way.
Figure 9:
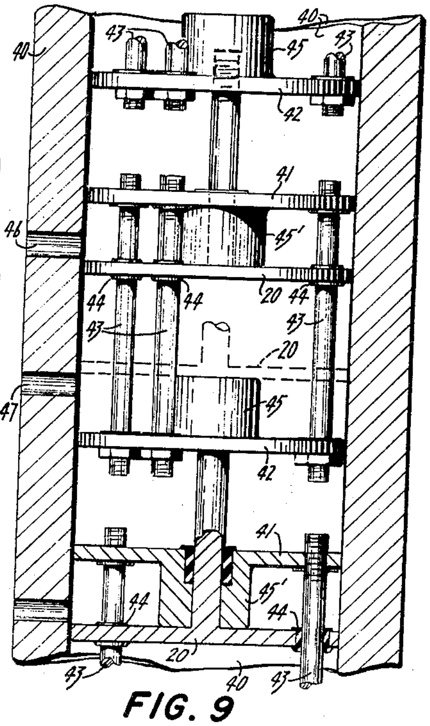

Fig. 9 is a vertical sectional view of that form of the invention illustrated in Fig. 1.

As shown in Fig. 1, a guide block 1 contains a plurality of individual cylinders 2 slidable therein, each having a pair of fluid connectors 3. A valve block 4 contains a plurality of solenoid valves operatively associated with the plurality of cylinders 2, and flexible fluid conduits 5, arranged in pairs, connect the individual solenoid valves with cylinders 2. Hydraulic fluid under pressure is conducted to the valve block 4 by a conduit 6 and is conducted therefrom to exhaust by a second conduit 7.

Figure 4:
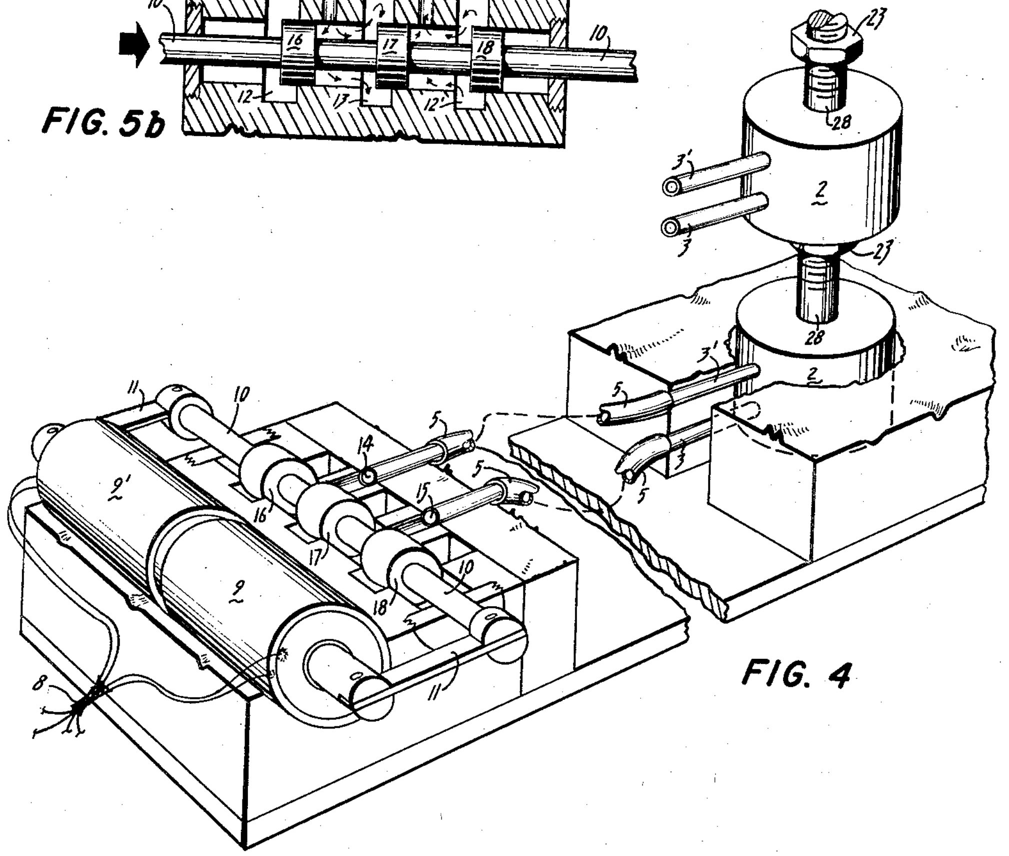
Fig. 4 is an enlarged fragmentary perspective view of a single solenoid valve connected to operate a cylinder.

An electric cable 8 conducts electric signals to pairs of solenoids 9 and 9' (see Fig. 4). The solenoids 9 and 9' are arranged to move in opposition to each other and are each linked to a valve spool 10 by a bar or other suitable mechanical linkage 11 and 11'. When the solenoid 9 is energized, the valve spool 10 will be moved to the left as illustrated in Figs. 4 and *5a*, and when the solenoid 9' is energized, the valve spool 10 will be moved to the right as illustrated in Fig. *5b*.

The hydraulic valve may be any conventional "four-way" valve, one of which is shown by Figs. *5a* and *5b*. Hydraulic fluid under pressure is conducted into the end chambers 12 and 12' of this valve and the central chamber 13 is connected to exhaust. A pair of ports 14 and 15 are intermediately positioned between the pressure chambers 12 and 12' and the exhaust chamber 13. The ports 14 and 15 are coupled to conduct hydraulic fluid to opposite ends of each cylinder 2 through the conduits 3 and 3'. If pressure is applied to port 14 while port 15 is permitted to exhaust hydraulic fluid, the piston will be driven to one end of the cylinder, and if pressure is applied to port 15 while the port 14 is permitted to exhaust the fluid, the piston will be driven to the opposite end of the cylinder. The valve spool 10 includes three collars of enlarged diameter 16, 17 and 18, which block the flow of fluid. When the valve spool is positioned to the left as shown in Fig. *5a*, hydraulic fluid under pressure is permitted to flow from the end chamber 12 into the port 14 while the return fluid is permitted to flow from the port 15 to the centrally positioned exhaust chamber 13. On the other hand, if the valve spool is positioned to the right as indicated in Fig. *5b*, the fluid under pressure is conducted from the end chamber 12' to the port 15, and the fluid from the port 14 is permitted to exhaust through the central chamber 13.

Figures 5A, 5B:
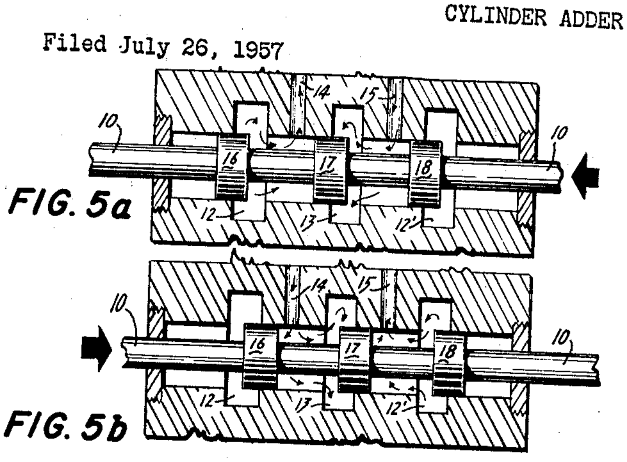
Figure 3:
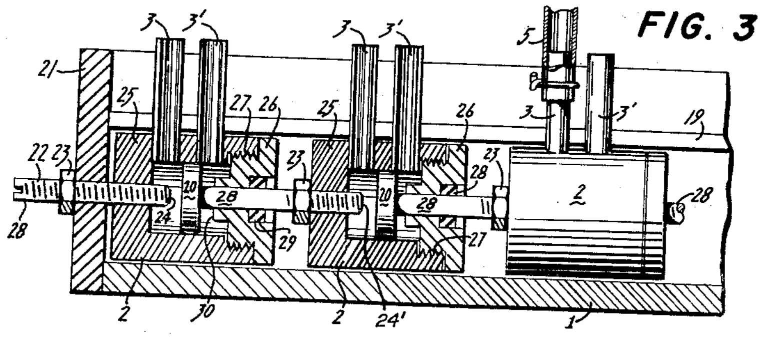
Fig. 3 is an enlarged fragment of Fig. 2 illustrating detail structure of the cylinder.

Fig. 3 illustrates the preferred embodiment of this invention wherein a plurality of cylinders 2 are slidably mounted in a guide way 1 having a longitudinally extended slotted opening 19. Each cylinder contains a movable piston 20 having a port at each end thereof with coupling stems 3 and 3' extending to a connection with a flexible tubing 5. The tubing 5 connects with the four-way valves as described in connection with Figs. 5*a* and 5*b* such that pressure may be selectively applied to one end of the cylinder 2 while the other end is exhausted.

As shown in Fig. 3, the first cylinder 2 is fixed to an end plate 21 which forms a part of the base for mounting and slideway 1 of this device. A threaded stud 22 with a lock nut 23 extends through the end of plate 21 to form an adjustable stop 24 which limits the movement of the piston 20. Each cylinder 2 is constructed with a cylinder body part 25 and a head or cap part 26. The body part 25 and the cap 26 have cooperating threads 27 for fixing the cap permanently to the cylinder. The cap 26 is provided with an opening to receive a stem or piston rod 28 and a packing gland 29 for containing the hydraulic fluid within the cylinder. A boss or shoulder part 30 extends inwardly from the cap to provide a second stop for limiting the movement of the piston 20. Thus, it is seen that the piston 20 is free to move or be displaced between the limits provided by the fixed stop 30 and by the adjustable stop 24. The piston stem or rod 28 is threadedly engaged to the next successive cylinder 2 and is locked in place by an appropriate locknut 23'. Thus, the piston rod or stem 28 of the first cylinder provides an adjustable stop 24' to limit the displacement of a second piston 20 in the second cylinder.

It will be appreciated from the foregoing description that the piston 20 within the first cylinder is free to move with the limits provided between the stops 24 and 30 and that such movement will be conveyed to the second cylinder. The second piston within the second cylinder will likewise be free to move within that cylinder between the stops 24' and 30' and such movement will be conveyed to the third cylinder. Thus, the third cylinder will be moved by an amount which totals the displacement of both of the foregoing pistons. Similarly, further pistons and cylinders may be added in this tandem arrangement as shown in Fig. 1 wherein seven cylinders and pistons are provided to move or displace an object which may be a transducer head or may be a simple point 31 which will give a total movement reading on a scale 32.

In the embodiment of this invention shown by Figs. 6 and 7 the cylinders 2 are slidably mounted within a cylinder guide way 1'. Within each cylinder is a piston 20 free to move between the fixed stops 33 and 34. Each piston rod or stem 28 extends through a suitable packing material 29 and is mechanically attached to the next successive cylinder 2. Thus, as in the former embodiment, each cylinder is driven by the previous piston and the total movement is equal to the sum of all the individual displacements.

In this embodiment, however, the fluid is passed into the cylinders through machined openings 35 and 36 in the stationary guide way 1. Each cylinder contains ports 37 and 38 at each end thereof, which ports open into an elongated groove or chamber 39 extending longitudinally along the outer portion of the cylinder. The chamber 39 thus provides a conducting path between the fixed openings 35 and 36 and the ports 37 and 38 within the movable cylinder. Since the elongated grooves or chambers 39 are at least as long as the displacement required for any particular cylinder, a fluid conducting path is provided between the four-way valves and each cylinder without the necessity of using flexible tubing 5 as shown in Fig. 1.

In the embodiment shown by Figs. 8 and 9 no individual cylinders as such are used. An outer cylinder 40 is provided within which are dividing plates or spacers 41 and 42 arranged in pairs and held in rigid spaced relation to each other by studs 43. Each pair of spacers 41 and 42 is combination with the outer cylinder 40 forms a fluid tight enclosure and essentially performs the function of the cylinders 2 in the other embodiments of this invention. Between each pair of end spacers 41 and 42 is slidably mounted a piston 20. The studs 43 must extend through the piston 20, and rubber grommets or other appropriate seals 44 are provided to prevent fluid leaking through the openings provided in the pistons and around the studs 43. An upwardly projecting bossed part 45 extends from the lower partition 42 and serves as a stop to limit the movement of the piston 20 and further serves as a connection into which a piston rod from the next preceding cylinder may be threadedly engaged. A similar bossed part 451 extends downwardly from the upper dividing partition 41 to provide another stop and to provide a housing for a fluid gland through which a piston rod may extend.

Thus, in the operation of this embodiment of this invention a piston 20 moves between two stops in the space between a pair of divider plates 41 and 42. The movement of the piston 20 is translated to move the next adjacent pair of divider plates wherein a second piston is contained, and thus the total displacement of the device is equal to the sum of the displacements of each individual piston within the dividing plates.

The fluid is passed into the space between these dividing plates and exhausted therefrom to move the piston through stationary ports 46 and 47 in the cylinder wall 40. In order to have an operable device the ports 46 and 47 must always connect with the space between a pair of dividing plates 41 and 42 and on opposite sides of the piston 20. To accomplish this end, the raised boss 45 must project inwardly from each spacer or dividing plate 42 by an amount equal to the diameter of the port 46 or 47 plus the maximum possible throw of the pair of spacers 41—42. The maximum possible throw of any pair of spacers is equal to the sum of the piston displacements of all of the pistons ahead of that pair of spacers, and in a binary adder this throw is equal to one linear unit less than the displacement of piston 20 positioned between the plates 41—42. For example, if the pair of spacers with the piston therebetween constitutes the third such device in a binary sequence, then the maximum possible throw of this pair of spacers is three linear units since the piston of the first device is displaceable by one linear unit, the piston of the second device is displaceable by two units, and the total for both pistons is three units. The third pair of spacers may therefore be thrown three linear units which is one unit less than the displacement of the piston therebetween, and the boss on each spacer of the third pair must project inwardly an amount equal to the diameter of the ports 46 and 47 plus three linear units of piston displacement. In the foregoing description it may be appreciated that if one linear unit is equal to the displacement or distance moved by a first piston of the binary sequence; a second piston may have a displacement of two units; a third piston may have a displacement of four units, etc. Apparatus having four tandemly coupled piston-cylinder combinations or piston-spacer plate combinations would be capable of producing a total displacement of seven linear units. By selectively displacing the various pistons, any desired number of linear units of movement may be obtained. If additional piston units are included with displacements of eight units, sixteen units, thirty-two units, etc.; then the total possible displacement is correspondingly increased. Thus, for example, six tandemly coupled piston-cylinder combinations could provide selective movement to any of sixty-three positions spaced uniformly from a zero or home position.

When the bosses 45 of the apparatus shown in Figs. 8 and 9 are dimensioned as specified above, each port 47 may be positioned between one of a pair of spacers and the piston between the spacers, and no possible throw of the spacers or displacement of the piston will cause either to cover or move past the port.

In a similar manner, the elongated grooves 39 of the embodiment of Figs. 6 and 7 must be of a length equal to the diameter of the ports 35 and 36 plus the maximum possible throw of the particular cylinder involved. To determine the maximum possible throw of any cylinder, the same logic as outlined above may be followed. Thus, in a sequence of binary cylinders the first movable cylinder may be thrown a maximum of one linear unit, the second movable cylinder may be thrown three linear units, the third may be thrown seven linear units, etc. In each case the throw of the cylinder will equal one less than the displacement of the piston therein, and the length of the grooves 39 and the positioning of the ports 35 and 36 is thereby determined.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for generating a mechanical translation in accordance with an electrical signal, said apparatus comprising a plurality of pressure responsive devices coupled together in tandem, each of said pressure responsive devices having a member displaceable between predetermined limits, and a control means responsive to the electrical signal operatively associated with all of said pressure responsive devices, said control means being operable to pass fluid under pressure to a selected side of the displaceable member and to exhaust fluid from the other side to move the displaceable member to a selected one of the predetermined limits.

2. Apparatus for generating a mechanical translation in response to a binary coded signal comprising a plurality of pressure responsive devices coupled together in tandem, each of said pressure responsive devices having a displaceable member therein, said member of a first device being coupled to move the next succeeding device, and a control means operatively associated with all of the pressure responsive devices, said control means being operable to pass fluid under pressure to a selected side of the displaceable member and to exhaust fluid from the other side thereof.

3. Apparatus for generating a mechanical translation in accordance with a binary coded electrical signal, said apparatus comprising a plurality of pressure responsive devices, each pressure responsive device having a piston displaceable between pre-set limits, and the displacements of the pistons of the devices having a binary relationship with each other, said devices being coupled in tandem such that the piston in a first of the devices is mechanically connected to move a second of the devices, and a control means responsively coupled to the binary coded electrical signal and operatively associated with all of the devices for passing fluid under pressure to a selected side of the piston and for exhausting fluid from the other side to selectively displace the piston whereby the translation generated is equal to the sum of selected ones of the binary related displacements of the pistons.

4. Apparatus for generating a mechanical translation comprising a plurality of cylinders, each cylinder having therein a piston displaceable between preset limits, said cylinders being coupled in tandem such that the piston in the first cylinder is mechanically coupled to move the second cylinder, and a controllable valve means operatively coupled to each cylinder for passing fluid under pressure to a selected end of the cylinder while exhausting the other end of the cylinder to selectively displace the piston therein whereby the translation generated is equal to the sum of the displacement of the pistons selectively displaced.

5. Translating apparatus comprising a plurality of cylinders, each cylinder having therein a piston displaceable between preset limits, said cylinders being tandemly coupled with the piston in a first of each adjacent pair of cylinders being mechanically connected to the second cylinder, a cylinder guide block having a internal bore, said cylinders being slidably positioned within the bore of the guide block, a valve block positioned in spaced relation to the cylinder guide block, a control valve operatively associated with each of the cylinders, said control valves being positioned in the valve block, and a pair of fluid conduits connecting between each cylinder and the control valve associated therewith, each control valve and pair of fluid conduits being operative to pass fluid under pressure to a selected end of the corresponding cylinder and to simultaneously exhaust the opposite end to selectively displace the piston therein.

6. Translating apparatus according to claim 5 wherein the valve block is parallel to and spaced apart from the cylinder guide block, and wherein each of the fluid conduits comprises a flexible tube extending between one of the cylinders in the guide block and the corresponding valve in the valve block whereby the valves may remain fixed and will control fluid passage to the cylinders which may move axially of the guide block.

7. Translating apparatus comprising an elongated guide block having a cylindrical bore extending longitudinally therein and having a continuous longitudinal slotted opening from the bore, a plurality of cylinders slidably mounted within the bore of the guide block, a piston displaceable between predetermined limits within each of the cylinders, each adjacent pair of cylinders being coupled to each other such that the piston in one of the cylinders is mechanically connected to and capable of displacing the other cylinder, and a flexible tube hydraulically connected to each end of each cylinder for passing hydraulic fluid under pressure to a selected end of each cylinder and for exhausting fluid from the other end to selectively displace the pistons and to cause a total translation equal to the sum of the displacements of the selected pistons, each of the flexible tubes extending outwardly from one of the cylinders through the slotted opening to permit freedom of movement of the cylinders within the bore.

8. Translating apparatus comprising an elongated guide block having a cylindrical bore extending longitudinally therein and having a continuous longitudinal slotted opening from the bore, a plurality of cylinders slidably mounted within the bore of the guide block, a piston displaceable between predetermined limits within each of the cylinders, each adjacent pair of cylinders being coupled to each other such that the piston in one of the cylinders is mechanically connected to and capable of displacing the other cylinder, a solenoid operated hydraulic valve operatively associated with each of the cylinders, and a pair of flexible conduits hydraulically connected between each valve and the cylinder associated therewith for passing fluid under pressure to a selected side of the piston while exhausting fluid from the other side, said flexible conduits extending through the slotted opening to permit freedom of movement of the cylinders within the bore.

9. Translating apparatus comprising a plurality of cylinders coupled in tandem, a piston movable between predetermined limits within each cylinder, each adjacent pair of cylinders being coupled together by a member mechanically connecting the piston in the first cylinder with the second cylinder such that the displacement of the piston within the first cylinder will result in a linear movement of the second cylinder, and a guide block having a cylindrical bore and having the cylinders slidably positioned within the bore, each of the cylinders having a port at each end thereof for passing hydraulic fluid to opposite sides of the piston therein, each of said ports being hydraulically connected to an elongated chamber extending longitudinally along the side of the cylinder, said guide block having an opening extending there-through to each of the longitudinally extending chambers in each of the cylinders whereby hydraulic fluid may be passed into and exhausted from selected sides of the piston in each cylinder through the chambers without restricting slidable movement of the cylinders.

10. Translating apparatus comprising a plurality of cylinders coupled in tandem, a piston movable between predetermined limits within each cylinder, each adjacent pair of cylinders being coupled together by a member mechanically connected between the piston in the first cylinder and the second cylinder whereby displacement of the piston results in a corresponding displacement of the second cylinder, a control valve hydraulically associated with each of the cylinders for selectively displacing the piston therein, and hydraulic means coupled between each valve and the cylinder associated therewith for passing fluid under pressure to one side of the piston in the cylinder and for exhausting fluid from the other side.

11. Translating apparatus according to claim 10 wherein each control valve comprises a solenoid operated pressure reversing valve and wherein each hydraulic coupling means comprises a pair of flexible tubes connected between a valve and the cylinder associated therewith.

12. Translating apparatus according to claim 10 wherein each control valve comprises a solenoid operated pressure reversing valve and wherein each hydraulic coupling means comprises a pair of elongated chambers extending longitudinally of each cylinder and connecting with ports opening into the cylinder on opposite sides of the piston, said elongated chambers connecting hydraulically with fixed ports associated with the valves.

13. Translating apparatus comprising a cylinder, a plurality of spacers associated in pairs and slidably positioned within the cylinder, means connecting and holding the spacers of each pair in a spaced apart relation, a piston slidably positioned between the spacers of each associated pair, and means mechanically connecting the piston between one of said associated pair of spacers with the next adjacent associated pair of spacers whereby a displacement of the piston will cause a corresponding movement of the next adjacent pair of spacers.

14. Translating apparatus comprising a cylinder having a plurality of ports for injecting and exhausting hydraulic fluid, a plurality of spacers slidably positioned within the cylinder and associated in pairs for containing hydraulic fluid therebetween, means connecting and holding the spacers of each pair in a spaced apart relation with each other, a piston slidably positioned in the cylinder between the spacers of each associated pair, means connecting the piston between one pair of spacers with the next adjacent pair of spacers, one of the ports being positioned on each side of the piston and between the associated spacers of each pair, and valve means hydraulically coupled to the ports and controllably associated with each pair of spacers for passing fluid under pressure to one side of the piston while exhausting fluid from the other side thereby selectively displacing each piston of the translating apparatus.

15. Translating apparatus comprising a cylinder having a plurality of ports for injecting and exhausting hydraulic fluid, a plurality of spacers slidably positioned within the cylinder and associated in pairs for containing hydraulic fluid therebetween, a plurality of studs connecting and holding the spacers of each associated pair in a predetermined spaced apart relation with each other, a piston positioned between the spacers of each associated pair, a piston rod connecting the piston between one pair of spacers with the next adjacent pair of spacers whereby a displacement of the piston will be translated thereto, said ports being spaced on opposite sides of each piston and a pair of ports being spaced between each associated pair of spacers, and a solenoid operated control valve associated with each pair of spacers, each of said control valves being hydraulically connected to the ports between a pair of spacers, said control valve being operative to pass fluid under pressure through one port to a first side of the piston while exhausting fluid from the other side thereof and thereby selectively displacing the piston.

References Cited in the file of this patent

UNITED STATES PATENTS

| | | |
|---|---|---|
| 691,692 | Zweigbergk | Jan. 21, 1902 |
| 2,077,962 | Smith | Apr. 20, 1937 |
| 2,197,867 | Klement | Apr. 23, 1940 |
| 2,481,648 | Dehn | Sept. 13, 1949 |
| 2,507,498 | Brown | May 16, 1950 |
| 2,659,531 | Thoresen | Nov. 17, 1953 |
| 2,714,906 | Peterson | Aug. 9, 1955 |
| 2,916,205 | Litz | Dec. 8, 1959 |

FOREIGN PATENTS

| | | |
|---|---|---|
| 522,107 | Germany | Apr. 4, 1931 |
| 705,403 | Great Britain | Mar. 10, 1954 |
| 1,012,523 | France | Apr. 16, 1952 |